(12) United States Patent
Hui et al.

(10) Patent No.: US 8,027,393 B2
(45) Date of Patent: Sep. 27, 2011

(54) EXPLICIT OUTBAND SIGNALING METHOD IN A WIRELESS NETWORK SUPPORTING COGNITIVE RADIO TECHNOLOGY

(75) Inventors: Junhong Hui, Yongin-si (KR); Jae-Myeong Kim, Seoul (KR); Sang-Jo Yoo, Incheon (KR); Duck-Dong Hwang, Yongin-si (KR); Jae-Hak Chung, Seoul (KR); Kwon-Moon No, Seoul (KR)

(73) Assignees: Samsung Electronics Co., Ltd., Suwon-si (KR); INHA—Industry Partnership Institute, Incheon (KR)

( * ) Notice: Subject to any disclaimer, the term of this patent is extended or adjusted under 35 U.S.C. 154(b) by 787 days.

(21) Appl. No.: 11/711,611

(22) Filed: Feb. 28, 2007

(65) Prior Publication Data
US 2007/0207737 A1    Sep. 6, 2007

(30) Foreign Application Priority Data
Feb. 28, 2006    (KR) .................................. 2006-19661

(51) Int. Cl.
H04K 1/10    (2006.01)
H04W 4/00    (2009.01)

(52) U.S. Cl. ........ 375/260; 455/434; 455/437; 455/442; 370/331; 370/352

(58) Field of Classification Search .................. None
See application file for complete search history.

(56) References Cited

U.S. PATENT DOCUMENTS

| | | | |
|---|---|---|---|
| 6,088,590 A * | 7/2000 | Anderson et al. ............. | 455/437 |
| 7,299,042 B2 * | 11/2007 | Moore et al. ................... | 455/434 |
| 2002/0141360 A1 * | 10/2002 | Baba et al. ..................... | 370/331 |
| 2003/0210680 A1 * | 11/2003 | Rao et al. ....................... | 370/352 |
| 2005/0288026 A1 * | 12/2005 | Byun et al. ..................... | 455/442 |
| 2006/0030318 A1 * | 2/2006 | Moore et al. ................... | 455/434 |

* cited by examiner

*Primary Examiner* — Jinsong Hu
*Assistant Examiner* — William Nealon
(74) *Attorney, Agent, or Firm* — NSIP Law

(57) ABSTRACT

An explicit outband signaling method for detecting sharable resources for management of public resources in a wireless network supporting Cognitive Radio (CR) technology. To this end, the invention transmits state information for the current channel to a CR system in order to enable communication of the CR users, whose communication with the CR system is impossible due to an influence of an incumbent system, thereby allowing the CR system to stop the use of the interference channel, and to provide a corresponding service with another channel.

33 Claims, 5 Drawing Sheets

EXPLICIT OUTBAND SIGNALING METHOD IN A WIRELESS NETWORK SUPPORTING COGNITIVE RADIO TECHNOLOGY

CROSS-REFERENCE TO RELATED APPLICATIONS

This application claims the benefit of Korean Application No. 2006-19661, filed Feb. 28, 2006 in the Korean Intellectual Property Office, the disclosure of which is incorporated herein by reference.

BACKGROUND OF THE INVENTION

1. Field of the Invention

Aspects of the present invention relate to a method to share resources using Cognitive Radio (CR) technology in a wireless network and, in particular, to an explicit outband signaling method to detect sharable resources for management of public resources.

2. Description of the Related Art

Recently, various types of wireless communication technologies have been developed and wireless communication technologies are being commonly used in daily life. The development of wireless communication technologies aims at providing data communication services, rather than voice-oriented services, at higher speed and lower cost. Therefore, an increase in the required amount of wireless resources is inevitable. The wireless resources can be frequency bands. However, most available wireless resources have already been allocated for existing wireless networks or existing communication services. For this reason, it is not possible to fulfill the demand for wireless resources, which is increasing due to the advent of new wireless networks and new communication services.

Cognitive Radio (CR) technology has been proposed as a scheme to use limited wireless resources efficiently. The CR technology allows another wireless network to share unused wireless resources among the wireless resources allocated to a particular wireless network. The need for the CR technology is increasing due to the present lack of wireless resources.

FIG. 1 illustrates an example of a general wireless network using CR technology. A first base station (BS) 110 is part of an existing wireless network that has already been allocated required wireless resources. The first base station 110 provides communication services for first user equipment 112, 114, 116, and 118 with the allocated wireless resources. A second base station 120 is part of a new wireless network that has been allocated no wireless resource, or has not been allocated sufficient wireless resources. The second base station 120 shares the wireless resources of the first base station 110 using the CR technology and provides communication services for the second user equipment 122, 124, 126, and 128 with public wireless resources.

The first base station 110 and the second base station 120 each have their own unique service areas where they will provide communication services. The first user equipment 112, 114, 116, and 118 are located in the service area of the first base station 110 and the second user equipment 122, 124, 126, and 128 are located in the service area of the second base station 120.

In addition, there is an area (hereinafter referred to as an "interference area") where the service area of the first base station 110 and the service area of the second base station 120 overlap. If the first base station 110 and the second base station 120 do not use the same wireless resources (i.e., the same channels), the user equipment may not experience interference with other base station signals even though they are located in the interference area. However, if the first base station 110 and the second base station 120 use the same wireless resources (i.e., the same channels), the user equipment located in the interference area may experience interference with other base station signals.

For example, assume that the second base station 120 provides communication services for the second user equipment 128 located in the interference area, using a channel x. The channel x corresponds to a wireless resource allocated to the first base station 110 but is not actually used. Assume that in this situation, the first base station 110 starts a communication service for at least one of the first user equipment 112, 114, 116, and 118 using the channel x. In this case, a signal transmitted from the first base station 110 and a signal transmitted from the second base station 120 are received together at the second user equipment 128 through the channel x. Therefore, the second user equipment 128 cannot decode the signal transmitted from the second base station 120 through the channel x, making communication impossible.

However, because the second base station 120 is not in the service area of the first base station 110, it cannot recognize the fact that the channel x is used by the first base station 110. Therefore, the second base station 120 will continue to transmit signals using the channel x. The signals continuously transmitted from the second base station 120 through the channel x serve as interference signals for the first user equipments 112 and 114 located in the interference area.

In order to solve the problem occurring by applying the CR technology to the conventional wireless network, there is a need for a scheme in which a second base station can recognize the fact that the channel x is used by the first base station.

SUMMARY OF THE INVENTION

Aspects of the present invention address the above and/or other problems and/or disadvantages and provide the advantages described below and/or other advantages. Accordingly, an aspect of the present invention is to provide a method in which a base station using CR technology (hereinafter referred to as a "CR base station") detects whether public wireless resources are used by a neighbor base station.

Another aspect of the present invention is to provide a method to minimize the possible interference occurring when a user equipment receiving a communication service from a CR base station uses public wireless resources.

Another aspect of the present invention is to provide a method to maintain a communication service using other public wireless resources when the public wireless resources currently used by a CR base station are used by a neighbor base station.

Another aspect of the present invention is to provide a signaling procedure between a base station and user equipment, both of which use CR technology for management of available public wireless resources.

Another aspect of the present invention is to provide a method to allocate wireless resources according to signaling between a base station and user equipment, both of which use CR technology for management of available public wireless resources.

Another aspect of the present invention is to provide a method to periodically broadcast information on the public wireless resources that a CR base station can currently use.

Another aspect of the present invention is to provide a method to detect whether the public wireless resources currently used by user equipment receiving a communication service from a CR base station are used by a neighbor base station.

Another aspect of the present invention is to provide a method in which a user equipment receiving a communication service from a CR base station sends a report to the CR base station upon detecting the fact that currently used public wireless resources are used by a neighboring base station.

According to one aspect of the present invention, there is provided an outband signaling method in a wireless network supporting Cognitive Radio (CR) technology. The method includes providing a communication service by a base station in the wireless network for a user equipment using a channel allocated with public wireless resources; periodically broadcasting, by the base station, resource allocation information through at least one channel allocable with currently unused wireless resources out of the public wireless resources; and replacing the channel for providing the communication service with another channel by the base station, if channel state information is received from the user equipment in response to the resource allocation information.

According to another aspect of the present invention, there is provided an outband signaling method in a wireless network supporting Cognitive Radio (CR) technology. The method includes receiving a communication service by a user equipment constituting the wireless network from a base station, using a channel allocated with public wireless resources; searching, by the user equipment, for another channel and receiving resource allocation information periodically broadcasted from the base station, upon failure to decode data for the communication service; and reporting channel state information from the user equipment to the base station in response to the resource allocation information. The channel state information includes information reporting the failure to decode the data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
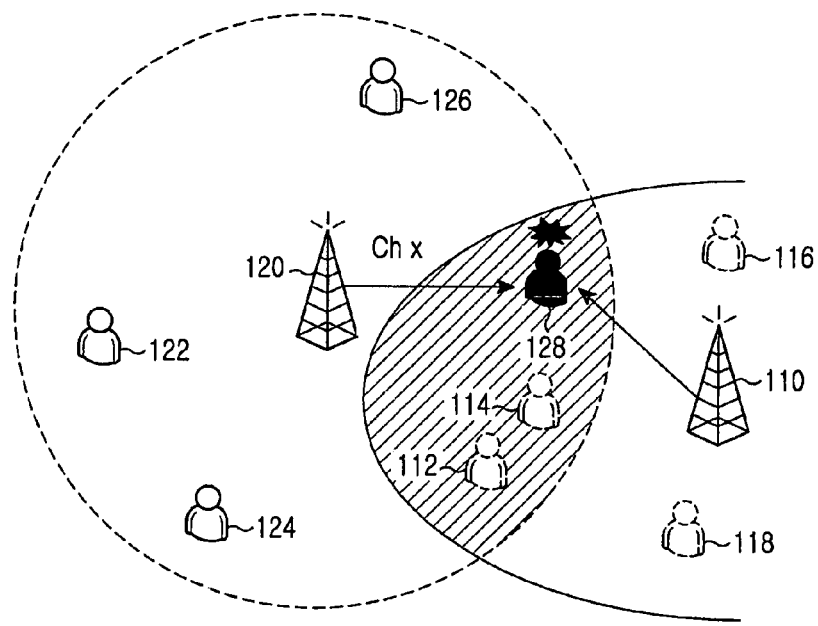
FIG. 1 is a diagram illustrating an example of a general wireless network using CR technology.
Figure 1:
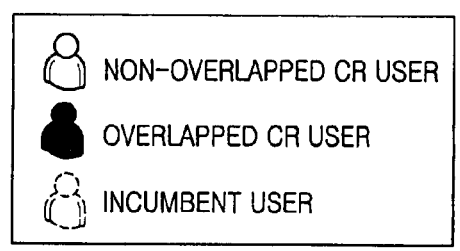

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Definitions of the terms used herein are given below.

CR System: a wireless communication system to which CR technology is applied.

CR Network: a wireless network that provides a communication service with a CR system.

CR Base Station: a base station that is part of a CR network and provides a communication service using public wireless resources based on CR technology.

CR User Equipment: user equipment (or client device) that is connected to a CR base station and receives a communication service from the CR base station using public wireless resources based on CR technology. CR user equipment may be, for example, a portable computer, mobile phone, portable entertainment device, digital camera, or a multifunctional device.

Incumbent System: an existing wireless communication system that uses previously allocated wireless resources and provides currently unused wireless resources from among the allocated wireless resources as public wireless resources for a CR system.

Incumbent Network: a wireless network that provides a communication service with an incumbent system.

Incumbent Base Station: a base station that is part of an incumbent network and is located in the vicinity of the CR base station to provide a communication service using previously allocated wireless resources.

Incumbent User Equipment: user equipment that is connected to an incumbent base station and receives a communication service from an incumbent base station using previously allocated wireless resources.

Public Wireless Resource: the currently unused wireless resource from among the wireless resources previously allocated for an incumbent network and used in a CR network. For example, the public wireless resource can be a channel using a frequency resource.

Outband Channel: a channel of the public wireless resources that is unused not only in an incumbent network but also in a CR network.

Outband Signal or Outband Broadcast Signal: a control signal that is transmitted using an outband channel.

Hidden Incumbent System: an incumbent system that causes interference to a CR user in a situation where a CR base station is unaware of the incumbent system.

The CR technology proposed by aspects of the present invention allows a new wireless network to use unused wireless resources of the wireless resources (i.e., frequency bands) allocated for an existing wireless network, without causing interference to the existing wireless network. It is important to prevent the user equipment connected to a wireless network that uses the previously allocated wireless resources from receiving interference due to the wireless resources shared by a new wireless network. It is also important to prevent the user equipment connected to a new wireless network from receiving interference due to the use of public wireless resources by the existing wireless network.

The following should be taken into account in order to apply the proposed CR technology.

First, CR technology may use various protocols or a physical layer in order to transmit control information through an outband channel. However, if the CR technology transmits control information in a method different from the data transmission method, the structure of CR user equipment may increase in complexity, causing additional overhead. Therefore, the transmission method of the control information should be the same as the data transmission method.

Second, CR technology may need an initialization process in order to transmit control information to the CR user equipment that cannot communicate with a CR base station, using the uplink (UL) resources which were not explicitly allocated. This initialization process may cause additional overhead. Therefore, in order to avoid the initialization process, there is a need for a method capable of transmitting control information using the uplink resources that were not explicitly allocated.

To this end, aspects of the present invention provide a way to transmit state information for the current channel to a CR system in order to enable communication for the CR users, whose communication with the CR system is impossible due to an influence of an incumbent system, thereby allowing the CR system to stop the use of the interference channel and to provide a corresponding service with another channel.

In addition, aspects of the present invention provide an outband signaling routine. In this routine, a base station, which is part of a wireless network supporting CR technology, provides a communication service for a user equipment using an arbitrary channel allocated with public wireless resources. The base station periodically broadcasts information on resource allocation through at least one channel allocable with currently unused wireless resources out of the public wireless resources. If information on a channel state is received from the user equipment in response to the resource allocation information, the base station replaces the channel, with which it provides the communication service, with another channel.

Further, aspects of the present invention provides an outband signaling routine. In this routine, user equipment, which is part of a wireless network supporting CR technology, receives a communication service from a base station using an arbitrary channel allocated with public wireless resources. Upon failure to decode data for the communication service, the user equipment searches for another channel, receives the resource allocation information periodically broadcasted from the base station through the searched channel, and reports information on its channel state to the base station in response to the resource allocation information.

Figure 2:
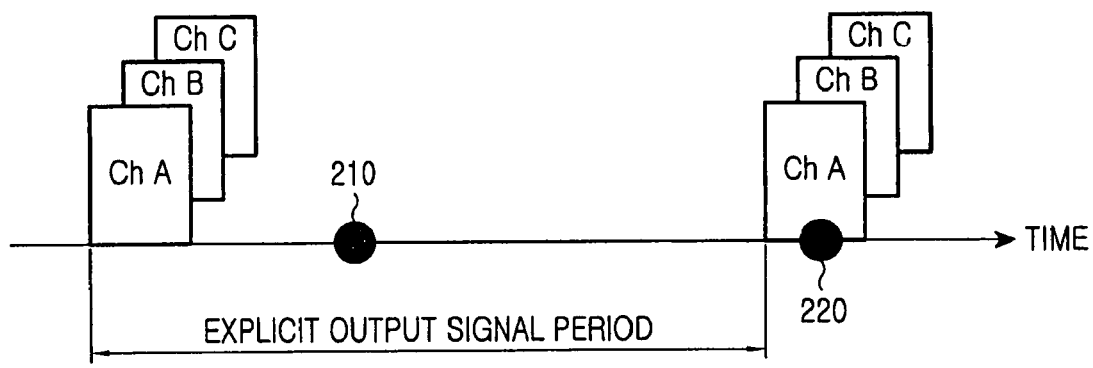
FIG. 2 is a diagram conceptually illustrating signaling between a CR base station and CR user equipment according to an embodiment of the present invention.

FIG. 2 conceptually illustrates signaling between a CR base station and a CR user equipment according to an embodiment of the present invention. A CR base station is providing a communication service for a CR user equipment using an arbitrary channel x. The CR user equipment receives data from the CR base station through an allowed downlink (DL) channel and transmits data to the CR base station through an allowed uplink channel. The channel x is allocated in a currently unused wireless resource, i.e., outband channel, out of the public wireless resources, for the communication service for the CR user equipment. Thereafter, the channel x is excluded from the outband channel. It is assumed herein that the CR user equipment is located in an interference area.

The CR base station periodically broadcasts control information at explicit outband signal periods, regardless of the communication service. The explicit outband signal period is determined based on a required detection time of an incumbent system. The control information, which may be resource allocation-related information, includes information (outband signal) on the currently used public wireless resources. The control information is transmitted using some or all of the currently available public wireless resources. For example, the control information is transmitted using at least one or all of the outband channels. In the example of FIG. 2, the control information is transmitted through a channel A, a channel B, and a channel C of the outband channels.

A frame format used for transmitting the control information may have the same format as the existing frame format for a physical layer and a Medium Access Control (MAC) layer, so as to prevent the CR user equipment from requiring additional protocols or physical layer modules to receive the control information. The CR user equipment fails to decode the data received from the CR base station through the channel x at a point 210. The reason why the CR user equipment fails to decode the received data is because the channel x is used by an incumbent base station. The signal transmitted using the channel x in the incumbent network is interfering with the data transmitted from the CR base station through the channel x.

The CR user equipment, if it fails to decode the received data, searches for another channel with which it can receive the signal transmitted from the CR base station. The CR user equipment receives the control information (outband signal) periodically broadcasted from the CR base station through the searched channel. The CR user equipment can receive the control information at a point 220 designated by an explicit outband signal period. In this case, the CR user equipment will receive the control information through at least one of the channel A, the channel B, and the channel C.

Figure 3:
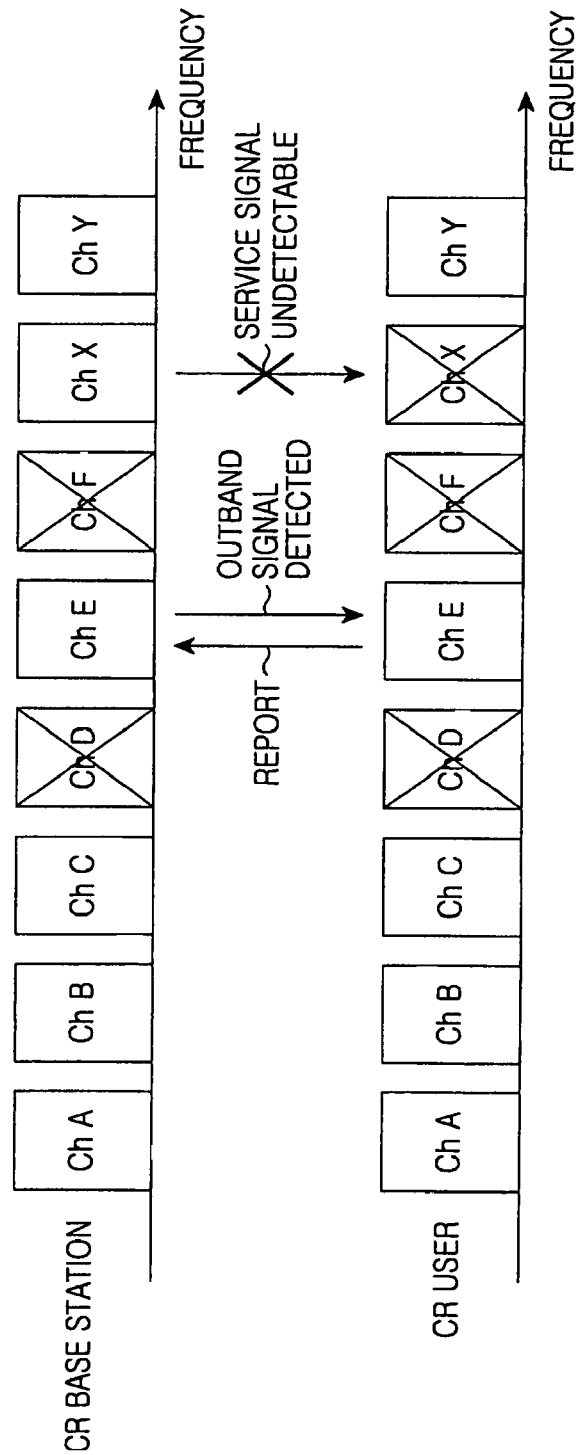
FIG. 3 is a diagram illustrating a procedure in which a CR user detects an outband signal and reports information on a channel state to a CR base station according to an embodiment of the present invention.

FIG. 3 illustrates a procedure in which a CR user detects an outband signal and reports information on a channel state to a CR base station according to an embodiment of the present invention. Eight channels, Ch A, Ch B, Ch C, Ch D, Ch E, Ch F, Ch X, and Ch Y, are allocated with public wireless resources. Of the 8 channels, 3 channels, Ch D, Ch F, and Ch X, are used for a communication service and the other 5 channels, Ch A, Ch B, Ch C, Ch E, and Ch Y, are outband channels. Further, of the 3 channels Ch D, Ch F, and Ch X, the channel Ch X is the channel currently used for a communication service between a CR base station and a CR user equipment described below. Other aspects of the present invention may employ and number and configuration of channels.

A CR base station periodically broadcasts an outband signal through 5 outband channels. The outband signal includes information on 3 channels, Ch D, Ch F, and Ch X, currently used for a communication service. The CR base station transmits a data signal for the communication service to the CR user equipment using the channel Ch X. In this situation, if the Ch X is used by an incumbent base station, the CR user equipment cannot decode the data signal transmitted from the CR base station. That is, the CR user equipment cannot decode data signals transmitted from the CR base station. This is because the signal transmitted from the incumbent base station using the Ch X interferes with the data signal transmitted from the CR base station.

The CR user equipment, if it fails to decode the data signal received through the Ch X, determines whether there is any signal received from the CR base station through channels other than the Ch X. As shown in FIG. 3, the CR user equipment receives an outband signal broadcasted from the CR base station through Ch E.

Upon receipt of the outband signal broadcast from the CR base station through the Ch E, the CR user equipment parses control information included in the outband signal. That is, the CR user equipment recognizes identifiers (IDs) of the channels currently used by the CR base station, depending on the control information. In addition, the CR user equipment determines whether an ID of the channel used up to now for the communication service is included in the recognized channel IDs.

If the ID of the channel used up to now is included in the recognized channel IDs, the CR user equipment reports information on its channel state to the CR base station using an uplink resource determined based on the control information. In FIG. 3, Ch E is selected as the uplink resource to transmit the channel state information. The channel state information includes information indicating that the Ch X used up to now for the communication service is used by an incumbent base station. The CR user equipment reports, to the CR base station, the information indicating that it cannot receive the data signal transmitted through the Ch X. Based on the channel state information reported from the CR user equipment, the CR base station recognizes that the Ch X is used by an incumbent base station. In addition, the CR base station replaces the channel for the communication service with the CR user equipment with one of the outband channels.

Figure 4:
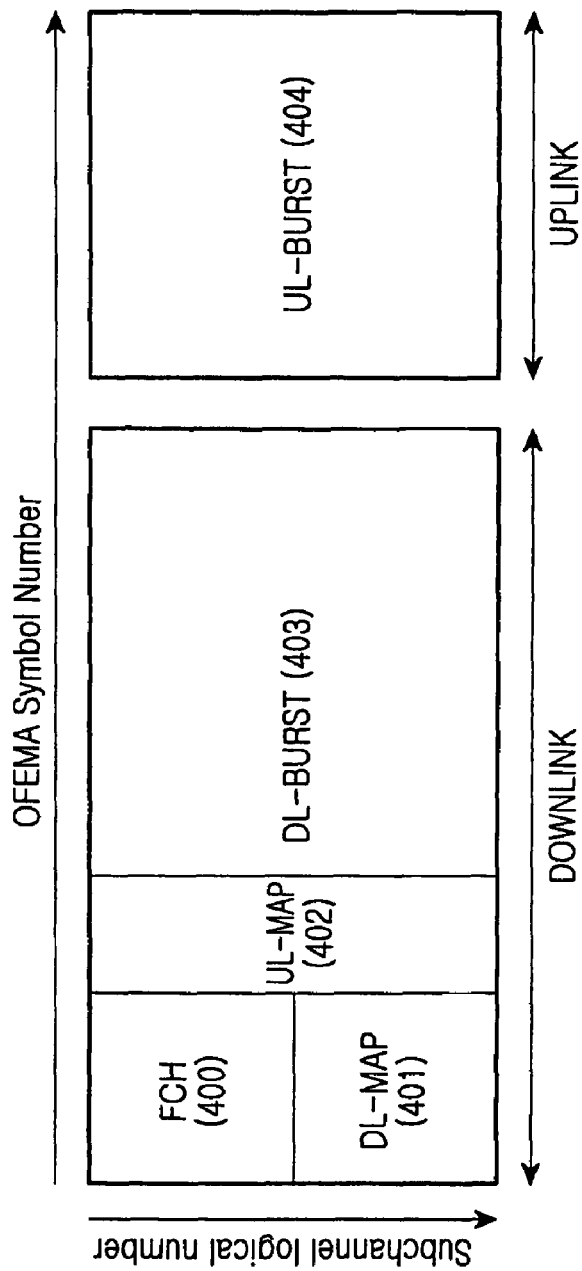
FIG. 4 is a diagram illustrating a format of a control frame periodically transmitted by a CR base station according to an embodiment of the present invention.

FIG. 4 illustrates a format of a control frame with which a CR base station periodically transmits control information according to an embodiment of the present invention. The frame shown in FIG. 4 is used in Orthogonal Frequency Division Multiple Access (OFDMA) technology. The frame includes Frame Check Header (FCH) 400, DL-MAP (downlink MAP region) 401, UL-MAP (uplink MAP region) 402, DL-Burst (downlink burst region) 403, and UL-Burst (uplink burst region) 404. The frame has the same format as the frame of a physical layer and a MAC layer transmitted for a communication service between a CR base station and a CR user equipment. Other aspects of the present invention may use other technologies.

Frame-related information is written in the Frame Check Header (FCH) 400. Information on downlink resources allocated for each user in one OFDMA frame is written in the DL-MAP 401 and information on uplink resources allocated for each user in one OFDMA frame is written in the UL-MAP 402. In addition, data that each user should receive is written in the DL-Burst 403, and data that each user desires to transmit is written in the UL-Burst 404.

In an embodiment of the present invention, one bit is added to the Frame Check Header 400 as an ID used to distinguish the frame. The ID is information used to determine whether the corresponding frame is a data frame to transmit data or a control frame to transmit control information (outband signal). For example, ID='0' indicates a data frame, and ID=T indicates a control frame. Information on the currently used channels and available channels (outband channels) is written in the DL-Burst 403 of the control frame.

The CR user equipment, upon failing to decode a data signal transmitted from a CR base station, searches for another channel and receives a MAC frame. In addition, the CR user equipment identifies a type of the received MAC frame by checking the Frame Check Header 400 of the received MAC frame. If the received MAC frame is a control frame, the CR user equipment parses information on the channel written in the DL-Burst 403. Thereafter, the CR user equipment writes information on its channel state in the UL-Burst 404 depending on the parsed channel information, and reports it to the CR base station.

The channel state information includes the information used by the CR user equipment to report the inability of the CR user equipment to decode the data signal received through the channel used up to now for the communication service. In addition, if the CR user equipment can detect the signal transmitted from the incumbent base station, the channel state information can include the information indicating that the channel used up to now for the communication service is being used by the incumbent base station. Moreover, the channel state information can include information on several channels measured by the CR user.

In order to report the channel state information to the CR base station as described above, the CR user equipment should be allocated uplink resources with which it will transmit the channel state information. To this end, the CR user equipment should have an initialization process. That is, in order to transmit the channel state information using a UL-Burst of the MAC frame, an initialization process should be performed between the CR base station and the CR user equipment. However, the initialization process creates overhead in the application of embodiments of the present invention. Therefore, there is a need for a scheme to reduce the overhead that may occur due to application of the present invention.

Figures 5A, 5B:
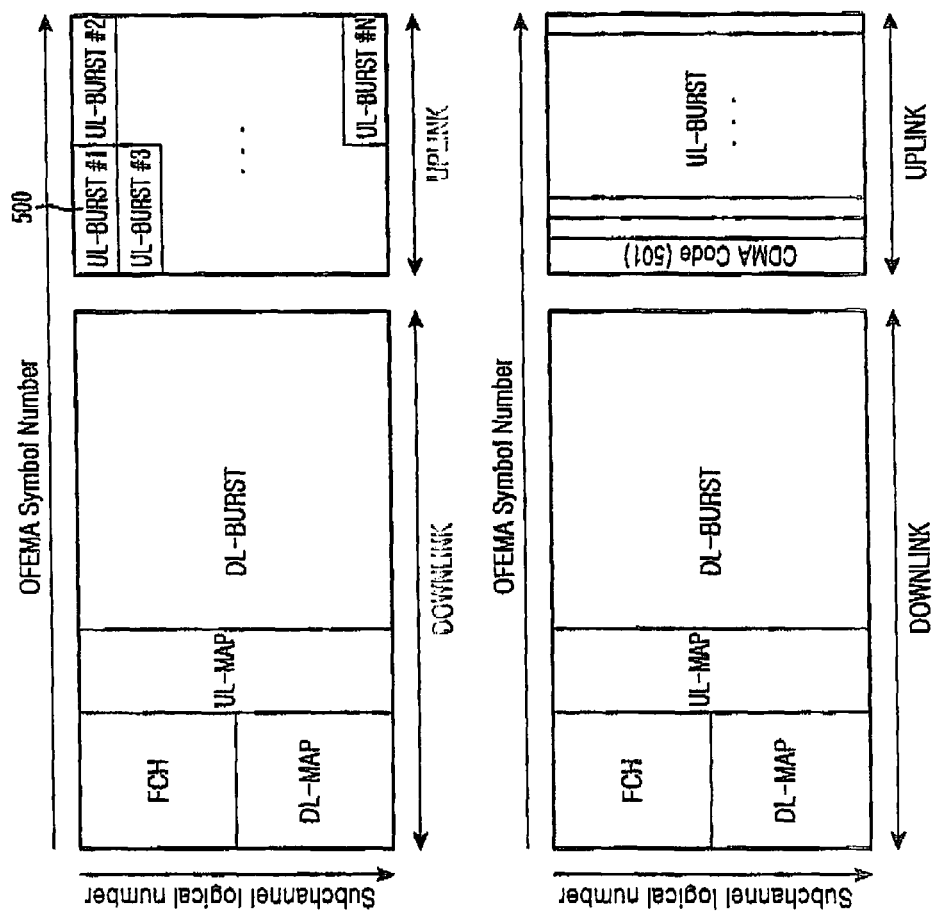
FIG. 5A is a diagram illustrating a format of a control frame, given for a description of a first scheme to reduce overhead according to an embodiment of the present invention.
FIG. 5B is a diagram illustrating a format of a control frame, given for a description of a second scheme to reduce overhead according to another embodiment of the present invention.

FIG. 5A illustrates a format of a control frame, given for a description of a first scheme to reduce overhead according to an embodiment of the present invention. FIG. 5B illustrates a format of a control frame, given for a description of a second scheme to reduce overhead according to another embodiment of the present invention.

Referring to FIG. 5A, the first scheme divides uplink resources allocated in a control frame into resources having a specific size and allocates a UL-Burst for each divided resource. The first scheme divides one existing UL-Burst constituting the control frame into a plurality of UL-Bursts 500. The size in which the uplink resources are divided is determined as the maximum resource size required by the CR user equipment to report the channel state information. In addition, allocation information of the UL-Bursts is written in a UL-MAP that is part of the control frame.

Upon receipt of the control frame, the CR user equipment randomly selects one of the UL-Bursts determined depending on the UL-Burst allocation information written in the UL-MAP. The CR user equipment writes information on its channel state in the selected UL-Burst and transmits the information. If the CR user equipment fails to receive a response to the transmitted channel state information from the CR base station, the CR user equipment concludes that the transmitted channel state information suffers a collision. In this case, the CR user equipment retransmits the channel state information using a technique such as random backoff.

Referring to FIG. 5B, the second scheme allocates a specific part of a UL-Burst that is part of the control frame as a region 501 to transmit a Code Division Multiple Access (CDMA) code. The UL-Burst can include a plurality of the regions to transmit a CDMA code. The CR user equipment randomly selects one of a plurality of CDMA codes. In addition, the CR user equipment randomly selects one of a plurality of the regions to transmit a CDMA code in the UL-Burst. The CR user equipment writes the selected CDMA code in the selected region and transmits the frame.

The CR base station parses the CDMA code selected by the CR user equipment through the region allocated for transmitting a CDMA code in the UL-Burst. In addition, the CR base station explicitly allocates uplink resources based on the parsed CDMA code. The CR user equipment reports its channel state information using the uplink resources allocated by the CR base station.

As can be understood from the foregoing description, aspects of the present invention allow a CR base station to recognize the fact that public wireless resources are used by an incumbent base station, so that CR users unable to communicate due to interference from the incumbent base station can rapidly restart the communication. In addition, aspects of the present invention provide for minimizing the interference that an incumbent user receives from the CR base station.

Moreover, the frame used for an embodiment of the present invention has the same format as the existing frame, thereby avoiding an increase in complexity. In addition, the CR user has no need to perform an initialization process before being allocated uplink resources for reporting its channel state information. As a result, a CR user located in an interference area can rapidly restart the communication service.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An outband signaling method in a wireless network supporting Cognitive Radio (CR) technology, the method comprising:
   providing, by a base station in the wireless network, a communication service for a user equipment using a first channel allocated with public wireless resources;
   periodically broadcasting, by the base station, resource allocation information through at least one unused channel allocable with currently unused wireless resources out of the public wireless resources;
   receiving channel state information from the user equipment using a second channel on which the user equipment detects the resource allocation information;
   determining that the first channel is used by an incumbent base station if the channel state information indicates that the user equipment fails to decode data transmitted through the first channel; and
   replacing the first channel providing the communication service with another channel in response to the channel state information,
   wherein the resource allocation information includes information including at least one channel used by the base station from among the public wireless resources.

2. The outband signaling method of claim 1, wherein the resource allocation information further includes information on the currently unused wireless resources.

3. The outband signaling method of claim 1, wherein the channel state information includes information reporting that data received through the channel providing the communication service cannot be decoded.

4. The outband signaling method of claim 3, wherein the channel state information further includes information reporting that the channel providing the communication service is used by a neighbor base station.

5. The outband signaling method of claim 4, wherein the channel state information further includes information on another channel measured by the user equipment.

6. The outband signaling method of claim 1, wherein a control frame used to broadcast the resource allocation information has the same format as a data frame used to transmit data for the communication service.

7. The outband signaling method of claim 6, further comprising: dividing a full uplink burst region of the control frame into a plurality of uplink burst regions having a specific size; and writing an uplink division information in an uplink MAP region of the control frame.

8. The outband signaling method of claim 6, further comprising allocating a Code Division Multiple Access (CDMA) code transmission region in an uplink burst region of the control frame.

9. The outband signaling method of claim 8, further comprising replacing the channel providing the communication service based on a CDMA code written by the user equipment in the CDMA code transmission region.

10. An outband signaling method in a wireless network supporting Cognitive Radio (CR) technology, the method comprising:
    receiving, by a user equipment in the wireless network, a communication service from a base station, using a first channel allocated with public wireless resources;
    searching, by the user equipment, for another channel upon failure to decode data for the communication service transmitted through the first channel, and detecting resource allocation information which is periodically broadcasted from the base station through at least one unused channel allocable with currently unused wireless resources out of the public wireless resources; and
    reporting channel state information by the user equipment to the base station using a second channel on which the user equipment detects the resource allocation information in response to detecting the resource allocation information, wherein the channel state information includes information reporting the failure to decode the data and indicating that the first channel is used by an incumbent base station,
    wherein the resource allocation information includes information indicating at least one channel used by the base station from among the public wireless resources.

11. The outband signaling method of claim 10, wherein the resource allocation information further includes information on the currently unused wireless resources.

12. The outband signaling method of claim 10, wherein the channel state information further includes information reporting that the channel providing the communication service is used by a neighbor base station.

13. The outband signaling method of claim 12, wherein the channel state information further includes information on another channel measured by the user equipment.

14. The outband signaling method of claim 10, wherein a control frame used to broadcast the resource allocation information has the same format as a data frame used to transmit data for the communication service.

15. The outband signaling method of claim 14, further comprising:
    dividing a full uplink burst region of the control frame into a plurality of uplink burst regions having a specific size; and
    writing an uplink division information in an uplink MAP region of the control frame.

16. The outband signaling method of claim 14, further comprising allocating a Code Division Multiple Access (CDMA) code transmission region in an uplink burst region of the control frame.

17. The outband signaling method of claim 16, further comprising replacing the channel providing the communication service based on a CDMA code written by the user equipment in the CDMA code transmission region.

18. A client device comprising:
    a receiver to receive a communication service from a base station using a first channel allocated with public wireless resources;

a controller to search for another channel upon failure to decode data for the communication service transmitted through the first channel and to receive resource allocation information which is periodically broadcasted from the base station through at least one unused channel allocable with currently unused wireless resources out of the public wireless resources; and a transmitter to transmit channel state information using a second channel on which the resource allocation information is detected in response to detecting the resource allocation information, the channel state information including information reporting the failure to decode the data and indicating that the first channel is used by an incumbent base station, wherein the resource allocation information includes information indicating at least one channel used by the base station from among the public wireless resources.

19. The client device of claim 18, wherein the resource allocation information further includes information on currently unused wireless resources.

20. The client device of claim 18, wherein the channel state information further includes information reporting that the channel providing the communication service is used by a neighbor base station.

21. The client device of claim 20, wherein the channel state information further includes information on another channel measured by the client device.

22. The client device of claim 18, wherein a control frame used to broadcast the resource allocation information has the same format as a data frame used to transmit data for the communication service.

23. The client device of claim 22, wherein a full uplink burst region of the control frame is divided into a plurality of uplink burst regions having a specific size, and an uplink division information is written in an uplink MAP region of the control frame.

24. The client device of claim 22, wherein a Code Division Multiple Access (CDMA) code transmission region is allocated in an uplink burst region of the control frame.

25. The client device of claim 24, wherein the channel providing the communication service is replaced based on a CDMA code written by the client device in the CDMA code transmission region.

26. A base station comprising:
a transceiver to provide a communication service to a client device using a first channel allocated with public wireless resources, to periodically broadcast resource allocation information through at least one unused channel allocable from currently unused wireless resources, and to receive channel state information from the user equipment using a second channel on which the user equipment detects the resource allocation information; and a controller to determine that the first channel is used by an incumbent base station if the channel state information indicates that the user equipment fails to decode a data signal transmitted through the first channel and to control the transceiver to communicate with the client device using another channel in response to the channel state information.

27. The base station of claim 26, wherein the resource allocation information further includes information on the currently unused wireless resources.

28. The base station of claim 26, wherein the channel state information further includes information reporting that the channel providing the communication service is used by a neighbor base station.

29. The base station of claim 28, wherein the channel state information further includes information on another channel measured by the client device.

30. The base station of claim 26, wherein a control frame used to broadcast the resource allocation information has the same format as a data frame used to transmit data for the communication service.

31. The base station of claim 30, wherein a full uplink burst region of the control frame is divided into a plurality of uplink burst regions having a specific size, and an uplink division information is written in an uplink MAP region of the control frame.

32. The base station of claim 30, wherein a Code Division Multiple Access (CDMA) code transmission region is allocated in an uplink burst region of the control frame.

33. The base station of claim 32, wherein the channel providing the communication service is replaced based on a CDMA code written by the client device in the CDMA code transmission region.

* * * * *